(12) United States Patent
Cargould et al.

(10) Patent No.: US 7,240,543 B2
(45) Date of Patent: Jul. 10, 2007

(54) TIRE POSITIONING SENSOR

(75) Inventors: Barry Cargould, Hudson, OH (US); Bradley S. Mularcik, Copley, OH (US); Keith A. Neiferd, Shelby Township, MI (US); Joseph A. Wnek, Toronto, OH (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 11/058,515

(22) Filed: Feb. 15, 2005

(65) Prior Publication Data

US 2005/0188755 A1    Sep. 1, 2005

(51) Int. Cl.
*G01M 17/02*    (2006.01)
(52) U.S. Cl. ...................................................... 73/146
(58) Field of Classification Search ................... 73/146
See application file for complete search history.

(56) References Cited

U.S. PATENT DOCUMENTS 4,023,407 A * 5/1977 Vanderzee .................... 73/146
4,787,150 A * 11/1988 Klinginsmith, III .......... 33/552
5,719,331 A * 2/1998 Delmoro ....................... 73/146
5,992,227 A * 11/1999 Jellison et al. ................ 73/146
6,016,695 A * 1/2000 Reynolds et al. ............. 73/146

* cited by examiner

*Primary Examiner*—Andre J. Allen
(74) *Attorney, Agent, or Firm*—Patton Boggs LLP

(57) ABSTRACT

A method and apparatus for chucking tires to be tested in a tire testing apparatus. A lower chuck assembly or spindle includes a lower rim that is engageable with a bead region of the tire to be tested. An upper chuck assembly includes an upper rim that is engageable with an upper bead region of the tire to be tested. The upper rim is reciprocally movable towards and away from the lower rim. A plurality of sensors associated with the movable rim monitors the closing distance between the upper rim and the side wall of the tire that is being chucked, during the chucking process. A controller controls the movement of the upper rim in response to the distance data obtained from the sensors. If the data obtained indicates that the tire is mispositioned on the lower rim, the controller will slow the rate of downward movement of the upper rim and reinitiate a chucking cycle if the upper rim reaches a predetermined lower position and the data from the distance sensors still indicates that the tire is not properly positioned. The sensors are mounted to an adjustable stripping mechanism that forms part of the upper chuck assembly. The positions of the sensors are adjusted as the tire strippers are adjusted.

24 Claims, 4 Drawing Sheets

TIRE POSITIONING SENSOR

TECHNICAL FIELD

The present invention relates generally to tire testing and, in particular, to an improved method and apparatus for clamping a tire between rim halves for testing purposes. It can serve as an improvement to the apparatus disclosed in U.S. Pat. No. 6,016,695 to Reynolds et al.

BACKGROUND ART

In currently available tire uniformity inspection machines, testing is fully automated. Tires are fed by conveyor to a test station where each tire is mounted upon two rim halves, inflated to a predetermined pressure and rotatably driven at a standard speed with its tread surface in abutting contact with the circumferential surface of a loadwheel. To mount a tire upon rim halves, a vertically movable upper rim is supported in the top of the machine and is mounted for movement towards and away from a lower rim mounted to a fixed, motor driven spindle mounted to the base of the machine. Other machines use a vertically movable lower rim that is supported in the base of the machine and is mounted for movement towards and away from an upper rim mounted to a fixed, motor driven spindle mounted to the top of the machine. In either case the tire is engaged between the rim halves and then testing.

To ensure proper alignment of the rim halves, the rim halves are mounted to machine members that include a male and female conical taper. Typically the upper rim half is mounted to an upper chuck assembly which includes the female conical taper and the lower rim half is mounted to the spindle assembly which includes the male conical taper. The engagement between the female conical taper and the male conical taper maintains precise alignment of the upper chuck assembly and rim half with the spindle assembly and other rim half. The movable rim half is commonly actuated by a hydraulic cylinder capable of moving the rim half quickly to engage the tire and capable of holding the rim half in place against the force created by the air pressure within the tire.

During operation of the machine, occasions occur where the tire is not placed in the proper location for engagement by the rim halves. The axis of rotation of the tire is not sufficiently close to the axis of rotation of the rim halves to ensure proper engagement. This mislocation can result in the tire being pinched by the rim halves or pinched between the male and female conical tapers, permanently damaging the tire. This is commonly called a mis-chuck. Additionally, since the tire is not concentric with the rim halves, one part of the circumference of the tire extends further away from the rim halves in a radial direction than would be if the tire was properly engaged. If the spindle is rotated in this condition, the part of the tire extending further from the rim halves can impact with various precision measurement devices placed in close proximity of the tire resulting in possible damage to the devices and/or tire.

Damaged tires must be destroyed. This is a significant cost to the manufacturer since almost all of the manufacturing costs have already been incurred at the time of damage. Costs are also incurred by machine damage or by additional effort spent to protect the machine from damage. When this occurs there is also a cost of lost production due to stopping the machine to clear the mis-chucked tire and possibly repair machine damage.

Some tire uniformity inspection machines monitor the hydraulic pressure required to close the rim halves. If the pressure is too great at a position of the movable rim half where a great pressure normally is not seen, then the operation is stopped before damage is done to the tire or machine. U.S. Pat. No. 5,390,540 to Mallison illustrates an example of this type of apparatus. However, some contact force is required to generate the pressure increase. This contact may leave a mark on the tire which may not be acceptable by the tire manufacturer.

DISCLOSURE OF INVENTION

The present invention provides a new and improved apparatus and method for effecting a tire mounting or clamping function in a tire testing station. According to a broad aspect of the invention, the apparatus comprises a lower chuck assembly that includes a lower rim engageable with a bead region of the tire to be tested. An upper chuck assembly includes an upper rim that is engageable with another bead region of the tire. One of the upper and lower rims is movable towards and away from the other of the rims. A plurality of sensors monitors the position of a tire on the nonmovable rim. A controller receives data from the sensors and controls movement of the movable rim in response to the data obtained from the sensors.

In the preferred and illustrated embodiment, the sensors are associated with the movable rim. As the tire is being chucked between the lower and upper rims, the sensors monitor the closing distance (at spaced locations on the side wall of the tire) between the movable rim and a tire resting on the stationary rim. In this embodiment, substantial differences in the distance measurements made by the sensors is an indication that the tire is not squarely positioned on the lower rim.

According to more specific features of the invention, the lower chuck assembly forms part of a power driven spindle. The spindle and chuck assemblies each include means to mount a rim half and means to keep the chuck assembly concentric with the spindle assembly while a tire is chucked. The chuck assembly also includes sensors that indicate the position of the tire being chucked and a sensor that monitors the position of the chuck assembly relative to the spindle. The sensors are used to determine the linear distance from the sensors to suitable target surfaces on the tire. The sensors are mounted to the chuck assembly so their sensing direction is toward the tire and parallel to the tires axis of rotation. In a more specific embodiment, they are located such that they indicate the distance to the sidewall of the tire and are mounted and calibrated so that their signals are all essentially equal when a tire is properly chucked.

At least three sensors are arranged around the circumference of the sidewall. The output signal of the sensors are connected to a programmable controller. The movement of the chuck assembly toward and away from the spindle is also controlled by the programmable controller.

When a tire to be chucked is placed between the rim halves, the chuck is extended toward the spindle to chuck the tire at a normally high rate of speed. When the chuck assembly is close enough to the tire, so that the tire is within the range of the sensors, the sensors measure the distance to the respective area of the sidewall of the tire. The programmable controller calculates the apparent slope of the sidewall plane from the sensor measurements and known distances between the sensors. If the calculated slope is too great, it is an indication that the tire is tilted and is at risk to be mis-chucked. When it is determined that a tire is at risk to be mis-chucked, movement of the chuck is slowed and the proximity of the chuck assembly to the spindle is limited to a minimum distance that is generally greater than the normal spacing between the rims when the tire is properly chucked. In this way, pinching of the tire is minimized should a mis-chuck occur. The apparent slope of the tire continues to be monitored as the chuck assembly approaches the spindle. If the apparent slope of the tire is reduced as the chuck is closing, it is an indication that the tire is now in an acceptable condition for chucking and movement of the chuck assembly resumes at a low speed to the fully closed position. This method detects and corrects a potential mis-chuck without applying a pinch pressure on the tire and without operator intervention.

If the chuck assembly reaches the minimum distance and the apparent slope of the tire is still too great so as to be at risk of a mis-chuck, the chuck assembly is then retracted some distance. An elevator may also raise the tire off the lower rim prior to or with the raising of the chuck. Then the chucking process is tried one more time. If the tire is not chucked on the second attempt, the chuck assembly is retracted and the machine is stopped.

In some instances, the tire may not be physically tilted but only miscentered. The sensors will then measure to areas on the sidewall that are not a similar radius. Because of the curvature of the sidewall of the tire in a radial plane, the sensors will measure different distances to the sidewall of a miscentered tire. This will result in an apparent tilt even though the tire is not tilted, just mis-centered. Since this condition appears identical to the tilted condition, it is treated in the identical manner.

In other instances the tire is tilted or mis-centered to such an extreme that one or more of the sensors cannot sense the sidewall of the tire at any distance. The output of the sensor is then at its extreme value and tilt calculations become meaningless. The programmable controller watches the signals of the sensors and if any are close to their extreme values, the tire is considered to be at risk of being mis-chucked and treated as described before.

In the preferred embodiment, the sensors are mounted to the frame of the tire strippers. The tire strippers are used to push the tire off of the upper rim half after the test is completed and the tire deflated. The tire strippers are adjustable to be close to the bead of the tire, but need to miss the rim half. In the illustrated embodiment, there are two tire stripper members on the chuck assembly. One is positioned toward the tire entrance and the other is positioned toward the tire exit.

The sensors also need to be adjustable to be over the sidewall of the tire for the full range of tires the machine is capable of testing, and at the same radius from the axis of rotation of the tire. IN the preferred and illustrated embodiment, the existing adjustment of the tire strippers is used for the sensor adjustment. The sensors are mounted on the tire stripper frames even though they only provide adjustment in the direction of tire flow. The sensors remain at an equal radius, but the distance between pairs of sensors changes for different tire sizes, since in the illustrated embodiment, the sensors are not also adjusted in directions perpendicular to tire flow. The sensors are positioned such that the average range of distance between the movable pair is equal to the distance of the fixed pair of sensors. The error that results is a small difference in apparent tilt from one pair of sensors with respect to the other for a given tilt condition. It should be noted here that the invention does contemplate an apparatus in which the distances between the three sensors are changed equally when an adjustment is made.

Additional features of the invention will become apparent and a fuller understanding obtained by reading the following detailed description made in connection with the accompanying drawings.

DETAILED DESCRIPTION OF THE PREFERRED EMBODIMENT

Figure 1:
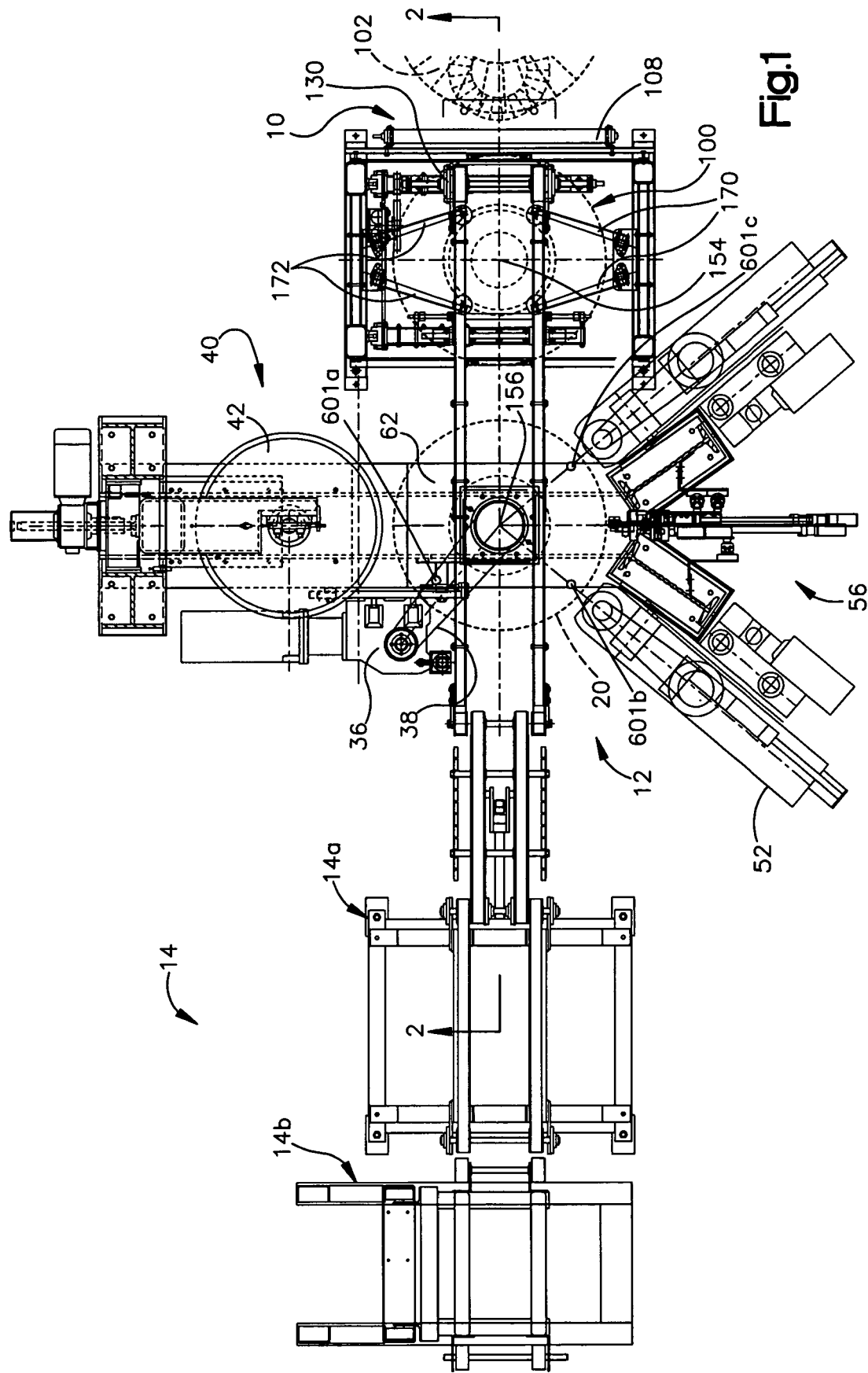
FIG. 1 is a plan view of a tire testing system including a tire position sensor subsystem constructed in accordance with a preferred embodiment of the invention.

FIG. 1 illustrates, in plan view, the overall arrangement of a tire testing system which includes a tire position sensor subsystem constructed in accordance with the preferred embodiment of the invention. Except for the tire position sensor subsystem, the illustrated tire testing apparatus may be conventional. In particular, the illustrated apparatus (except for the tire position sensor subsystem) is more fully described in U.S. Pat. No. 6,016,695 entitled Tire Uniformity Testing System which is hereby incorporated by reference. Additional details of specific features of the tire uniformity testing system are described in U.S. Pat. No. 5,992,227 entitled Automatic Adjustable Width Chuck Apparatus For Tire Testing Systems, which is also hereby incorporated by reference.

To facilitate the explanation, it should be noted that reference characters, except for those reference characters referring to tire position sensors and related components correspond to the reference characters used in the above two referenced patents. It should also be noted here that the disclosed tire position sensor subsystem can be adapted to other types of tire testing equipment and should not be limited to the type of tire testing equipment illustrated in the above two identified patents.

By way of summary and referring to FIG. 1, the conventional portion of the overall tire testing system comprises the following subsystems: an inlet conveyor 10, a testing station 12, an exit module 14 and an optional marking station 14a and tire sorting mechanism 14b. A tire positioned at the testing station 12 is tested and optionally ground to adjust the roundness, mechanical uniformity and/or other physical properties of the tire. In FIG. 1, a tire indicated by reference character 20 (shown in phantom) is delivered to the testing station by the inlet conveyor 10 so that the tire is clamped between a lower rim 24 and an upper rim 26 which is shown best in FIG. 3 (in FIG. 4, the upper and lower rims are indicated by the reference characters 26a, 24a, respectively).

Figure 3:
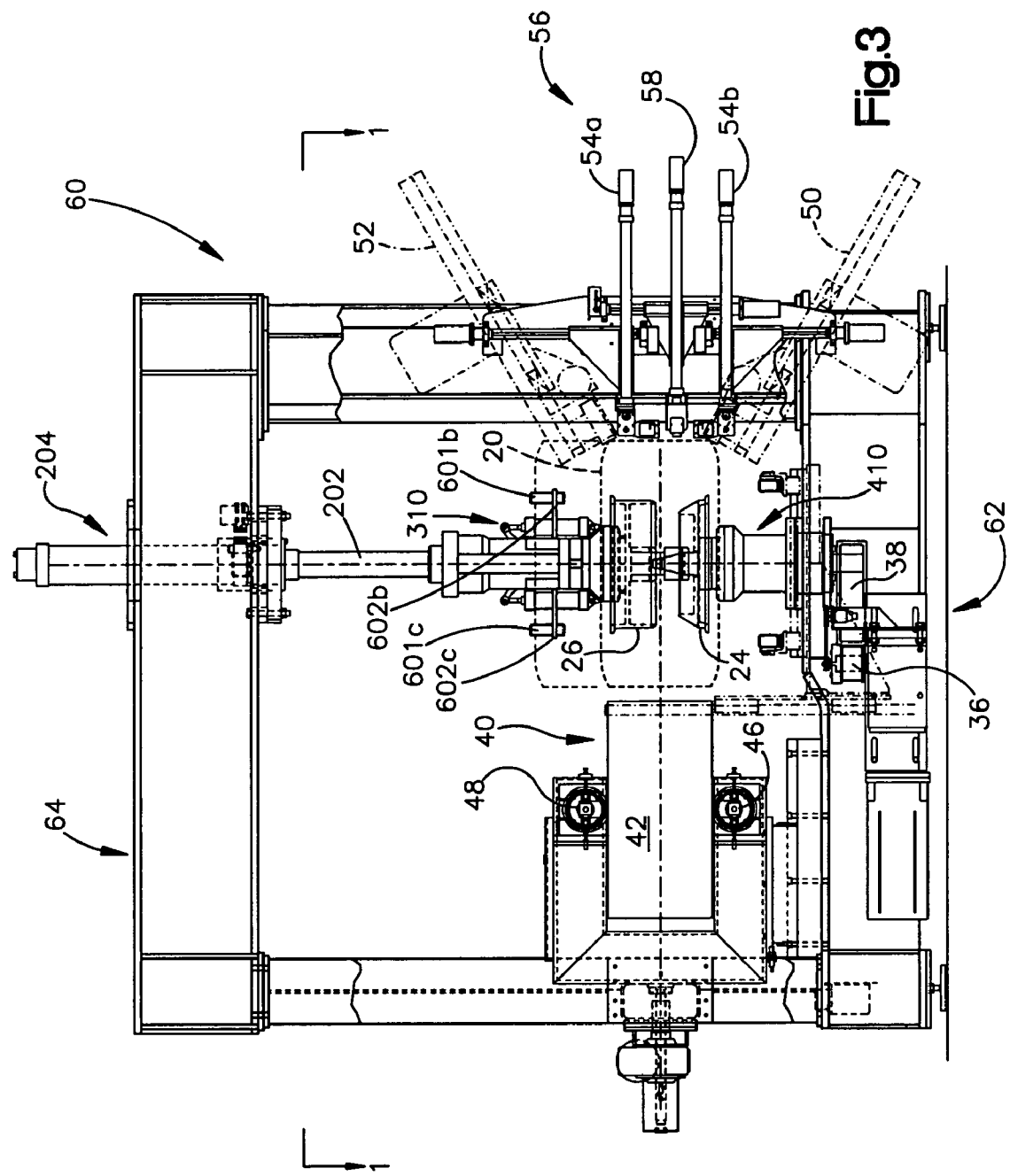
FIG. 3 is a side elevational view of the tire testing station shown in FIG. 2; and, FIG. 4 is a front elevational view of a movable chuck assembly and spindle assembly and illustrating details of the mounting of the tire position sensors.

As is conventional, the tire is clamped between the rims 24, 26 (or 24a, 26a—FIG. 4) and inflated. After inflation, a load wheel assembly 40 including a load wheel 42 is moved into abutting relationship with the outer surface of the tire 20. As is conventional, the tire is rotated against the load wheel which monitors the load exerted by the tire via load cells 46, 48 (as seen in FIG. 3). As is known in the art, the data taken from the load cells is used to determine the uniformity of the tire.

The tire position sensor subsystem of the present invention operates during the clamping/mounting of a tire to be tested i.e. during the step in which the tire is clamped, between the upper and lower rims 24, 26. According to the invention, at least three sensors 601a, 601b, 601c are carried by an upper chuck assembly 310 (shown best in FIGS. 3 and 4). In the illustrated embodiment, the sensors may comprise ultrasonic sensors available from Allen Bradley and identified as 873P-DBAVI-D4. These three sensors monitors the closing distance between the upper chuck/rims and three distinct side wall regions of a tire being clamped, as the upper rim 26 moves towards the lower rim 24.

As seen best in FIG. 1, the sensors 601a, 601b, 601c are spaced apart, with each being located on a radial line extending from the axis of rotation 156 for the lower chuck 24. The three sensors monitor the distance between three discrete locations on the sidewall of the tire. If the measured distance between the upper chuck and the side wall of the tire is substantially the same for all three sensors, the tire is assumed to be in proper position with respect to the upper and lower chucks and, as a result, the clamping procedure is allowed to proceed normally, i.e., the upper chuck moves rapidly towards the lower chuck until it reaches its preset final position that is determined by the tire size and is typically preprogrammed into the system.

If, on the other hand, the distances between the tire regions and associated sensors vary beyond a preset limit, the tire position sensor subsystem immediately causes the speed at which the upper chuck travels downwardly towards the lower chuck to be substantially reduced. The upper chuck continues to travel downwardly at a substantially lower rate of speed. Depending on the degree misalignment of the tire, the resulting slow engagement of the upper rim 26 with the tire may allow the tire to realign itself as the upper chuck makes contact with the tire. In addition to reducing the speed of travel, and depending on tire size, the tire position sensor subsystem may inhibit the upper chuck assembly from traveling to its fully lowered position, if that position would cause damage to a tire due to pinching, etc. by the upper and lower rims.

The tire position sensor subsystem continues to monitor the distance between the sensors and the associated regions on the tire as the upper chuck slowly travels towards the lower rim. If upon reaching a mis-chuck lower limit of travel for the upper chuck, the sensors still sense a misalignment or tilting of the tire, the upper chuck is raised by the chuck control system and the clamping step is then re-executed.

Figure 2:
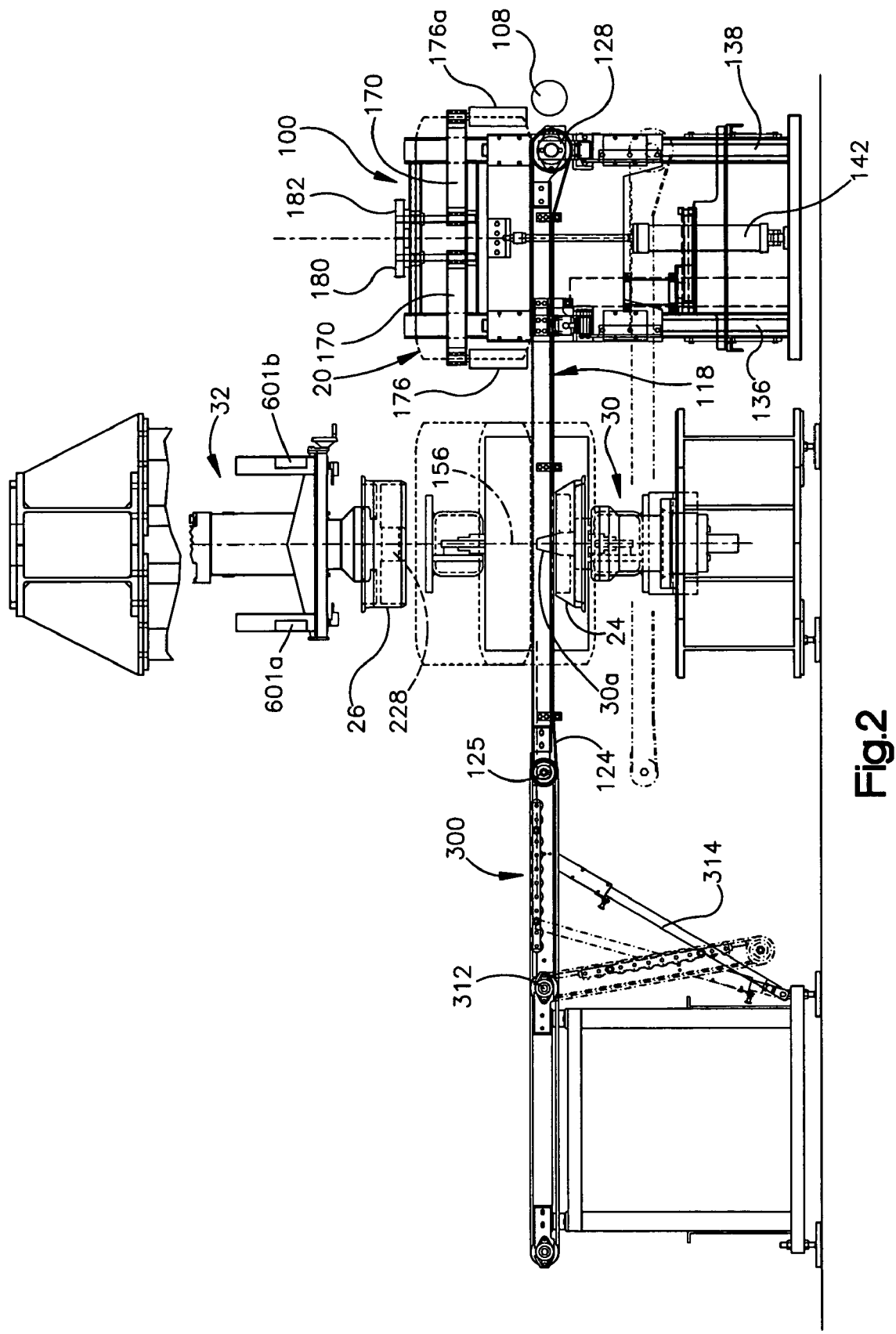
FIG. 2 is a fragmentary front elevational view of a tire testing station forming part of the tire testing system shown in FIG. 1 and further illustrating tire position sensors forming part of the invention.

To further facilitate centering of the potentially mis-chucked tire, the tire conveyor 118 or tire handler (which delivers the tire to the centering station and is then lowered during testing of the tire, shown best in FIG. 2) is also raised in order to lift the tire off the lower spindle 30. The raising of the conveyor 118 may occur prior to, during and/or after raising of the chuck assembly 32. At commencement of the re-execution of the clamping step, the elevator 118 is lowered which in turn lowers the tire onto the lower rim 24.

If after the second attempt, the sensors still sense a tilted or out of position tire, the upper chuck is preferably then raised to an upper clear tire position and the testing station is then deactivated until the tire can be removed from the chuck region by the operator.

It has been found that with the present invention an initially misaligned tire can be centered well enough for proper clamping. The bottom rim half typically has a conical taper to further assist in centering the tire as it is engaged by the lower rim. By extending the movable rim half toward the fixed rim half, but not so close as to pinch the tire, the tire will often begin to move to a more central location because of the conical taper of the lower rim. Retracting the movable rim in this condition allows the tire the freedom of movement to continue to move to a more central location, generally close enough to allow proper chucking. Now the movable rim half cam be extended toward the fixed rim half in a normal manner and chuck the tire.

In the preferred embodiment, the tilt of the tire is calculated using the r.m.s. (root mean sum) combination of the two measured tilts. The diagram below represents a plan view of the testing station. In the diagram, A, B, and C indicate the sensor location relative to one another and to the tire. A line from A to B is generally perpendicular to a line from B to C. Let $d_a$, $d_b$ and $d_c$ represent the distance to the tire measured by the respective sensor. Let $\overline{ab}$ be the distance between A and B and $\overline{cb}$ be the distance between B and C. When the tire is level all the distances are approximately equal.

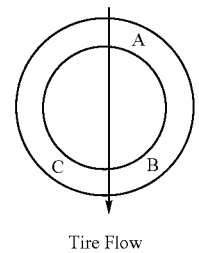

Tire Flow

When the tire is tilted there are differences between the distances measured to the tire. The slope of the tire plane in the AB direction is calculated by $$\frac{d_a - d_b}{\overline{ab}}$$

and the slope of the tire plane in the CB direction is calculated by $$\frac{d_c - d_b}{\overline{cb}}$$

The r.m.s. of the slopes is $$\sqrt{\left(\frac{d_a - d_b}{\overline{ab}}\right)^2 + \left(\frac{d_c - d_b}{\overline{cb}}\right)^2}$$

Assume that $\overline{ab} \approx \overline{cb}$ then the r.m.s. slope is $$\frac{1}{\overline{ab}}\sqrt{(d_a - d_b)^2 + (d_c - d_b)^2}$$

Dividing by the distance between sensors is just scaling. If the limits of acceptable tilt are selected accounting for this distance, then the apparent tire tilt can be represented by $$\text{tiretilt} = \sqrt{(d_a - d_b)^2 + (d_c - d_b)^2}$$

Figure 4:
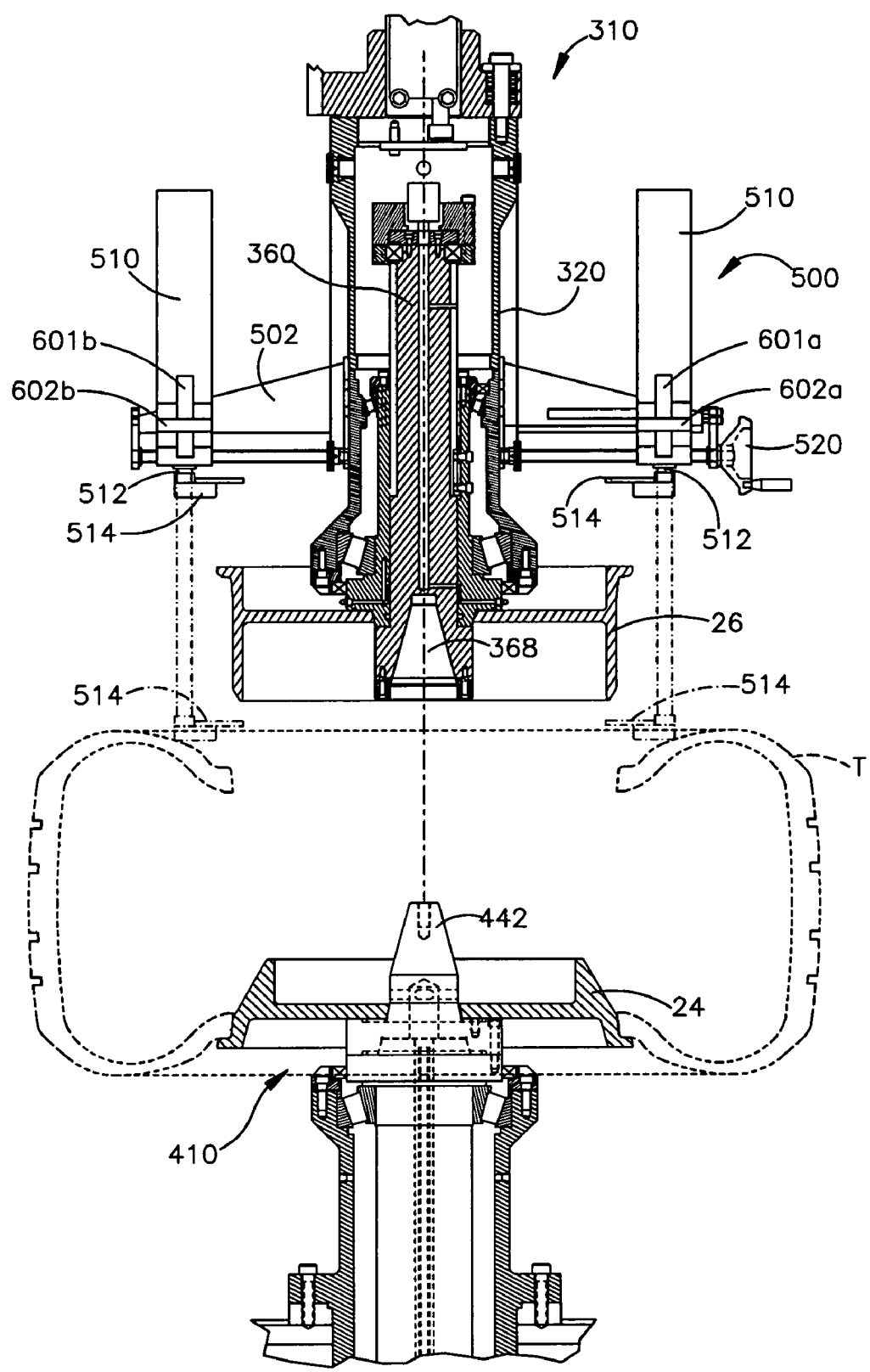

Turning next to FIG. 4, details of the mounting of the sensors 601a, 601b are illustrated. In the preferred embodiment, the tire testing system includes a stripper mechanism indicated by the reference character 500 which forcibly removes the tire from the upper rim 26a. As is conventional, the stripper mechanism 500 includes a pair of air cylinders 510 which are moveably mounted to a plate or suitable bracket 502 secured to the outer housing 320 of the chuck assembly by any suitable fastening means. The mechanism 500 is thus secured to and moves along with the chuck assembly 310. In accordance with the invention, the sensors (sensors 601a, 601b are shown in FIG. 4 and the sensor 601c is shown in FIG. 3) are mounted to the stripper assembly by associated brackets 602a, 602b, 602c. As is more fully explained in U.S. Pat. No. 5,992,227, the stripper mechanism and, in particular, the spacing between the strippers 514 and associated air cylinders 510 is adjustable. Movement of the air cylinders 510 towards and away from each other is provided by a rotatable handwheel 520. As the handwheel 520 is rotated, the air cylinders 510 move either towards and away from each other depending on the direction of rotation. In accordance with the invention, the brackets 602a and 602b are attached to the mountings for the air cylinders and, as a consequence, the sensors 601a, 601b move towards and away from each other as the handwheel 520 is rotated.

In this embodiment, and referring to FIGS. 1 and 3, the sensor 601c is not movable with respect to the sensor 601b. In other words, both sensors move together as the handwheel 520 is rotated. The invention does contemplate an adjustment mechanism, however, in which all three sensors move inwardly or outwardly in unison to accommodate tires of various diameters. It has been determined, however, that for at least a certain range of tire diameters, the slight error that may result in the tilt calculation by moving the sensor 601c with the sensor 601b is negligible.

It has been found that the following components can be used as part of a tire position sensor subsystem constructed in accordance with an embodiment of the invention. In particular, ultrasonic sensors denoted as Allen-Bradley 873P-DBAVI-D4 can provide satisfactory results. The sensors are calibrated such that a zero volt output represents a 100 mm distance and a 10 volt output represents a 600 mm distance. The ultrasonic sensors are connected to a control logix analog input denoted as a Allen-Bradley AB 1756-1F8 using a Lumberg RKTH4-635/40M cable. The control logix analog input is suitabely connected to a PLC forming part of the machine and which controls the other machine functions. When using this hardware, it has been found that single ended inputs of the module should be used, the module should be configured in floating point mode and the module filter frequency should be 60 Hz.

Although the invention has been described with a certain degree of particularity, it should be understood that those skilled in the art can make various changes to it without departing from the spirit or scope of the invention has hereinafter claimed.

We claim:

1. A tire testing apparatus, comprising:
 a) a lower chuck assembly including a lower rim engageable with a bead region of the tire to be tested;
 b) an upper chuck assembly including an upper rim engageable with another bead region of the tire to be tested;
 c) one of said upper and lower rims reciprocally movable towards and away from the other of said lower and upper rims;
 d) a plurality of sensors for monitoring the alignment of the tire with respect to said lower rim; and,
 e) a controller for controlling the of movement of said movable rim in response to data obtained from said sensors.

2. The apparatus of claim 1 wherein said upper rim is the reciprocally movable rim.

3. The apparatus of claim 1 wherein said plurality of sensors is associated with said movable rim and said sensors monitor the distance between said movable rim and a side wall of said tire, as said movable rim moves towards said other rim.

4. The apparatus of claim 1 further including an elevator mechanism for lowering a tire to be tested onto said lower rim and further operative to raise said tire off said lower rim under predetermined operating conditions.

5. The apparatus of claim 4 wherein one of said predetermined operating conditions is the sensing by said sensors of a misaligned tire with respect to said lower rim.

6. The apparatus of claim 3 wherein said plurality of sensors comprises three sensors, at least two of which are adjustably movable towards and away from each other in order to adjust for changes in tire sizes being tested.

7. The apparatus of claim 6 wherein said sensors are all located in a common transverse plane.

8. The apparatus of claim 6 wherein said sensors are ultrasonic sensors.

9. The apparatus of claim 6 wherein said controller uses distance data obtained from said sensors to determine whether a tire is tilted with respect to said lower rim.

10. The apparatus of claim 6 wherein said sensors are mounted to a stripper mechanism forming part of said upper chuck assembly.

11. The apparatus of claim 10 wherein the position of said sensors are adjusted concurrently with an adjustment made to said stripper mechanism.

12. A method for chucking a tire to be tested in a tire testing apparatus of the type that includes a fixed rim and a movable rim that is reciprocally movable towards and away from the fixed rim, comprising the steps of:
 a) providing a plurality of distance sensors associated with said movable rim, said sensors monitoring the distance between the movable rim and a side wall region on a tire to be tested;
 b) using distance data provided by said sensors to determine whether said tire is tilted with respect to an axis of rotation of said fixed rim; and,
 c) upon detecting tilting of said tire with respect to said lower rim greater than a predetermined limit, slowing the rate of movement of said movable rim towards said fixed rim until said movable rim reaches a predetermined distance from said fixed rim.

13. The method of claim 12 further comprising the steps of:
 a) upon reaching said predetermined distance, using data from said sensors to determine whether said tire is in a proper position between said fixed and movable rims; and,
 b) upon determining that said tire is not in a proper position, moving said movable rim away from said fixed rim.

14. The method of claim 12 comprising the steps of:
a) using data from said sensors to determine whether said tire is in a proper position between said fixed and movable rims;
b) upon detecting that said tire is not in a proper position, moving said movable rim away from said fixed rim; and,
c) separating said tire from said fixed rim.

15. The method of claim 14 further comprising the steps of:
a) lowering the tire onto said fixed rim;
b) moving said movable rim towards said fixed rim;
c) using said sensors to monitor the distance between said movable rim and said tire;
d) using data from said sensors to determine whether said tire is tilted with respect to a rotational axis of said lower rim; and,
e) upon detecting a predetermined tilt condition, slowing the rate of movement of said movable rim towards said fixed rim until said movable rim reaches a predetermined distance from said fixed rim.

16. The method of claim 15 comprising the steps of:
a) upon reaching said predetermined distance, using data from said sensors to determine whether said tire is properly held between said fixed and movable rims; and,
b) upon detecting that said tire is not in a proper position between said rims, deactivating said testing apparatus.

17. The method of claim 16 wherein said plurality of sensors comprises three sensors which are adjustably mounted in association with said movable rim.

18. The method of claim 17 comprising the steps of:
a) mounting said sensors to an adjustable stripper mechanism that is associated with said movable rim and adjusting the spatial position of said sensors by adjusting said stripper mechanism in accordance with a size of a tire to be tested.

19. A method for chucking a tire to be tested in a tire testing machine, comprising the steps of:
a) providing a fixed lower chuck including a rotatable rim that is engageable with a first bead region on said tire to be tested;
b) providing a movable upper chuck including a rotatable rim mounted for reciprocating movement towards and away from said lower rim, said upper rim engageable with a second bead region on said tire to be tested;
c) placing a tire to be tested on said lower rim;
d) moving said upper rim towards said lower rim while monitoring the closing distance between said upper rim and three spaced regions on a side wall of said tire;
e) using said monitored distances to determine whether said tire is not property positioned on said lower rim;
f) upon detecting that said tire is not in a proper position on said lower rim, decreasing the rate of movement of said upper rim until said upper rim reaches a predetermined distance with respect to said lower rim;
g) upon reaching said predetermined distance, using said distance measurements to determine whether said tire is properly positioned between said lower and upper rims; and,
h) upon determining that said tire is not in a proper position between said lower and upper rims, moving said upper rim away from said lower rim; and,
i) re-executing steps d-g.

20. The method of claim 19 whereupon determining in step h that said tire is not in proper position, deactivating said tire testing machine.

21. The method of claim 20 wherein prior to re-executing steps d-g, disengaging said tire from said lower rim and then again placing said tire on said lower rim.

22. The method of claim 21 wherein said step of disengaging and re-placing said tire on said lower rim is performed by a reciprocally movable conveyor associated with said lower chuck assembly.

23. The method of claim 19 wherein said predetermined distance is chosen, such that should a tire be misaligned with respect to said lower rim it will not be pinched between the upper and lower rims to the extent that damage is inflicted to the tire.

24. A method for chucking a tire to be tested in a tire testing apparatus of the type that includes a lower rim and an upper rim, said rims being relatively movable towards and away from each other, comprising the steps of:
a) providing a plurality of sensors for monitoring the alignment of a tire with respect to the lower rim as said rims move relative to each other;
b) using data provided by said sensors to determine whether said tire is tilted with respect to an axis of rotation of said lower rim; and,
c) upon detecting tilting of said tire with respect to said lower rim greater than a predetermined limit, slowing the rate of relative movement between said rims until said rims move relative to each other to a predetermined minimum spaced distance.

* * * * *